Jan. 4, 1938. H. PYCHLAU 2,104,378
OUTPUT DOSE METER
Filed Sept. 23, 1933  4 Sheets-Sheet 1
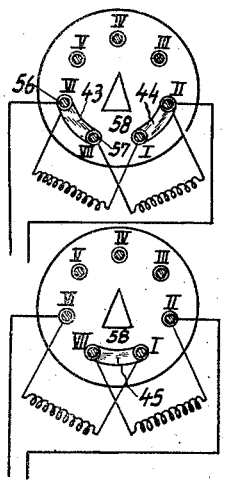
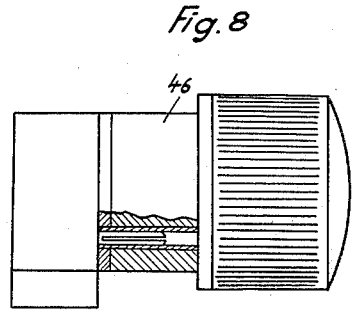
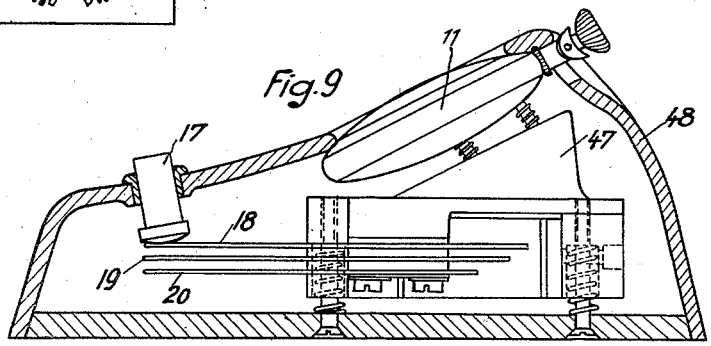
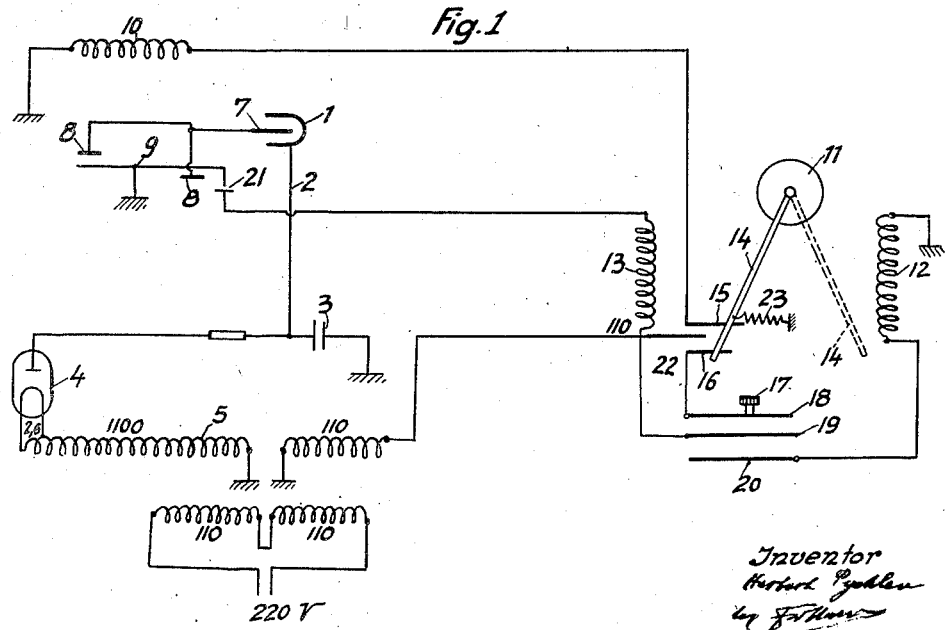

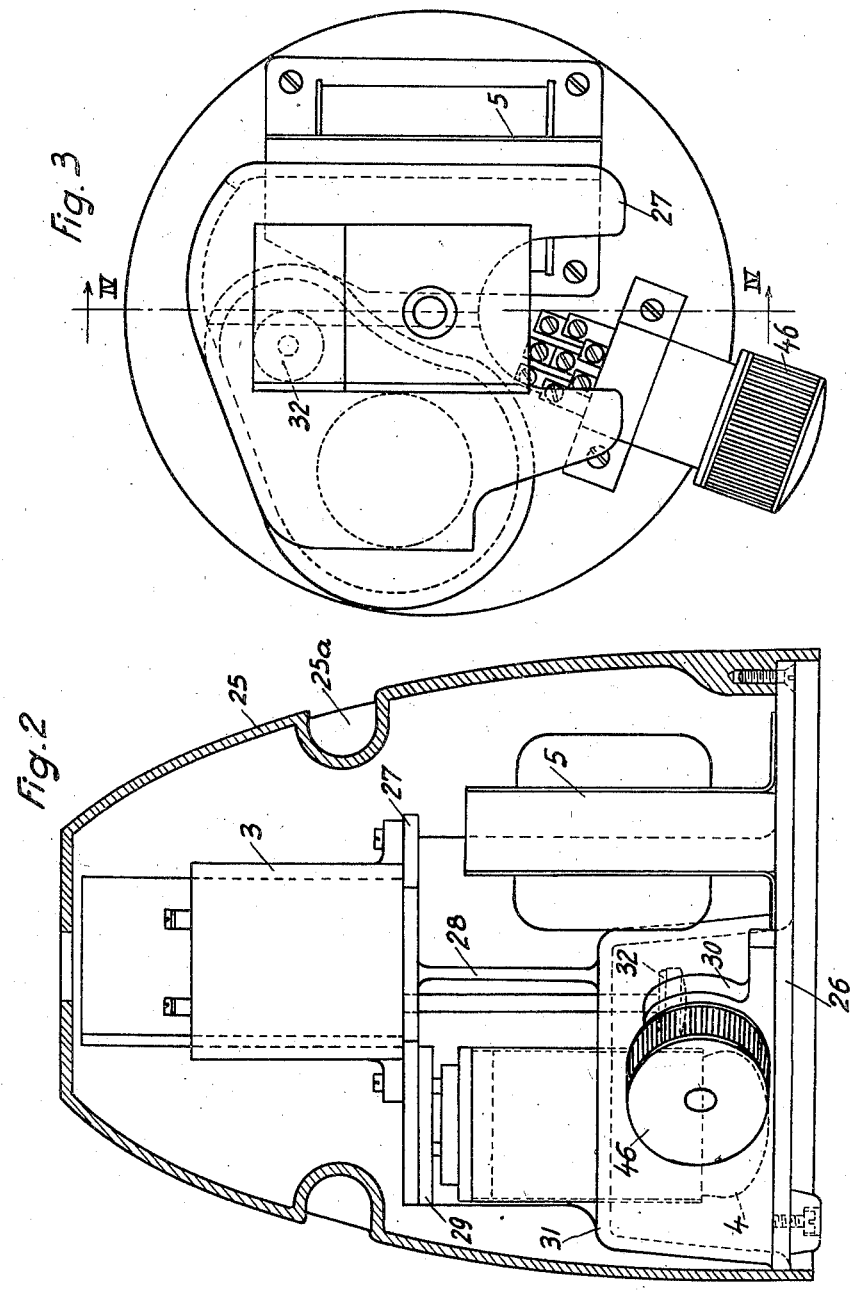

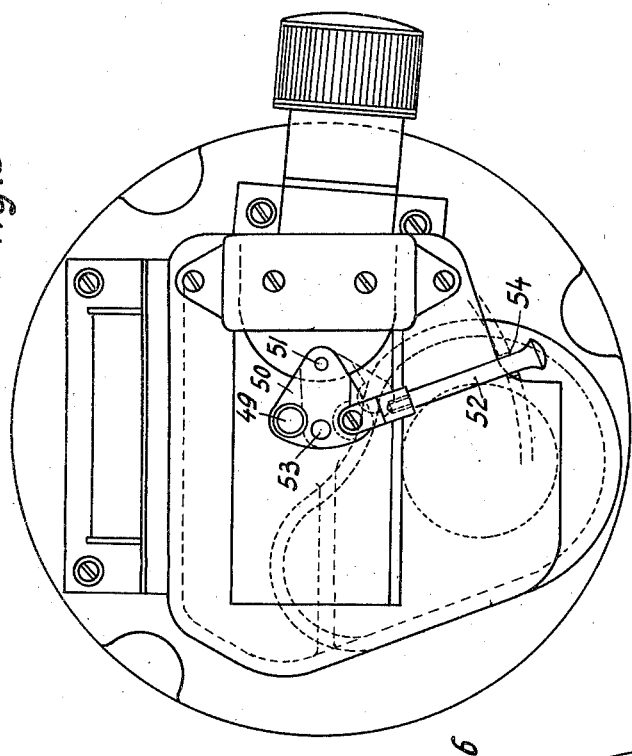

Jan. 4, 1938.                H. PYCHLAU                 2,104,378
                            OUTPUT DOSE METER
                          Filed Sept. 23, 1933          4 Sheets-Sheet 4

Inventor
Herbert Pychlau
by
his attorney

Patented Jan. 4, 1938

2,104,378

UNITED STATES PATENT OFFICE 2,104,378

OUTPUT DOSE METER

Herbert Pychlau, Freiburg, Germany

Application September 23, 1933, Serial No. 690,703
In Germany September 24, 1932

10 Claims. (Cl. 250—34)

To measure the radiation of a Röntgen tube by utilizing for charging or discharging a capacity, an ionization current produced in a radiation field is known. For potential measuring an electrometer constructed as a relay is preferably used, which automatically re-establishes the initial condition at the termination of every discharge. The number of the re-chargings or dischargings in a time unit can be measured by a counting mechanism and forms a measure for the radiation output.

The dose meters based on this measuring method have proved satisfactory. They are, however, comparatively expensive, and an instrument is wanted which is cheaper to produce and possesses nevertheless a sufficient degree of reliability and measuring accuracy. The output dose meter according to the invention fulfills these requirements. It is based upon the method, known per se, to measure the time during which the discharge of a capacity is completed, and from the time the radiation output in roentgens per minute, or to determine the same with the aid of a chart.

A dose meter, working with ionization chamber and electrometer relay is, according to the invention, connected by a push-key contact with an electromagnetically controlled stop watch. If, at the beginning of the measuring, the push-key is depressed, it closes in the first switch step the circuit of an electromagnetic switch, which earths the electrometer system. In the second switch step it starts a stop watch which is also electromagnetically controlled. The control element of this watch is constructed as switch element for the earthing switch and interrupts, when the time meter is being started, the earthing circuit which, if the watch is cut out by the relay circuit, at the end of the measuring period, is closed so that the relay is earthed again and returns into the initial position.

All parts of the instrument, with the exception of the stop watch, are located in a handy casing of special construction in the smallest possible space. The casing has approximately the shape of a truncated cone or of the head of a shell, in the flattened point of which the window for the entrance of the rays to be measured is arranged. For the shape of the casing the determining factor was the idea of arranging at the central point the aperture of the instrument receiving the Röntgen rays, and to shape the casing so that the inlet aperture can be easily centered under a tube from which the rays emanate. For this purpose a shape strongly tapered towards the upper end has been chosen.

The stop watch is accommodated together with the push-key switch in a separate casing, connected with the main instrument by a plug cord of any desired length. Thus, it is possible for the operator of the instrument to remain absolutely protected against radiation, independently of the sighting conditions. A pressure on the push-key initiates the measuring operation and the result becomes visible automatically after a few seconds.

The invention is illustrated by way of example in the accompanying drawings, in which:—

Fig. 1 shows a circuit diagram for the instrument according to the invention.

Fig. 2 is a vertical section through the casing showing in elevation the parts arranged on a base plate in the interior of the casing.

Fig. 3 shows in top plan view the base plate with the internal equipment after the removal of the casing.

Fig. 4 is a vertical section on line IV—IV of Fig. 3.

Fig. 5 is a top plan view of the motor showing the internal equipment below line V—V of Fig. 4.

Fig. 6 is a section on line VI—VI of Fig. 4 viewed in the direction of the arrow.

Figs. 7 and 7a show the exchangeable switching discs of the plug coupling for connecting the dose meter to a network of 110 and 220 volts respectively.

Fig. 8 shows the plug coupling partly in section.

Fig. 9 is a side elevation showing the electromagnetic stop watch with its switching device, the casing of the instrument being in section.

Figure 10:
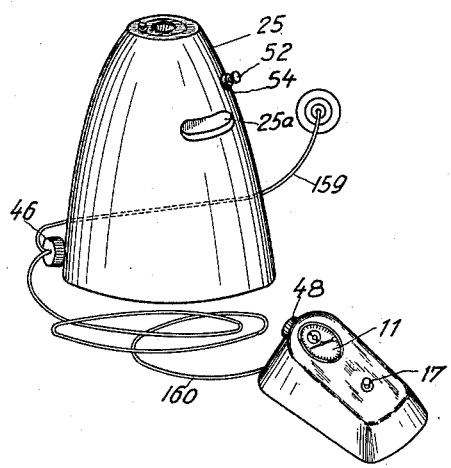
Fig. 10 is a perspective view of the meter.

In the switching diagram I designates the ionization chamber, the conductive inner wall of which is connected by the wire 2 to one of the electrodes of the condenser 3, the other end of which is earthed. This condenser is charged by means of valve 4 from the transformer winding 5 to a potential of about 1500 volts. The insulated internal electrode 7, which is connected to the measuring system of the electrometric relay, projects into the chamber.

This relay consists of a blade 9 rotatable about an axis, and designed to swing between two plates 8, connected with the electrode 7, whereby the blade 9 is earthed. When the tension in these two plates has reached a certain value they attract the blade 9 against the action of its resilient suspension until it closes the contact 21 and discharges the charge in the manner hereinafter described over the magnet coil 10 to earth.

In Fig. 1 the electromagnetic stop watch 11 is illustrated diagrammatically on the right.

This electromagnetic stop watch 11 has two magnet coils 12 and 13, between which a magnet armature 14 can oscillate to and fro. If the coil 12 is energized, the balance wheel of the watch is liberated. If the coil 13 is energized, the balance wheel is stopped by the armature 14. In the position shown the magnet armature is in the stop position of the watch. In this position it shorts the spring contacts 15 and 16.

For carrying out a measuring the key 17 is depressed, whereby first spring contacts 18 and 19 are closed, so that a circuit is closed from the 110 volt winding of the transformer through the spring contacts 18, 19 and 15, 16 to the magnet 10. By this current impulse a pivotally mounted armature 10a (Fig. 4) is attracted so that an arm 10b mounted thereon is swung upwards into contact with one of the plates 8 and thus earths the electrometer system 8, 9 shortly before the beginning of the measuring operation. If the depressing of key 17 continues, also the spring contact 20 is touched, whereby a second circuit through the coil 12 is established. This coil attracts the armature 14 and thereby starts the stop watch. At the same instant the contact closure between the spring contacts 15 and 16 ceases so that the magnet coil 10 becomes currentless and the earthing of the plates 8 is interrupted. The key 17, on being released, is then returned into its initial position by the spring contact 18.

If then Röntgen rays enter the chamber 1, which is placed under tension by the condenser 3, the air in the chamber is gradually ionized and becomes conductive according to the strength of the radiation. Thus the electrometer system 8 is gradually re-charged and, at a certain potential the blade 9 is turned so far that the contact 21 is closed. Current is then supplied to the coil 13 which attracts the armature 14. This armature swings to the left so that it not only touches the spring contacts 15 and 16 but also the spring contact 22. It thus stops the stop watch. At the same time current is supplied again to the magnet coil 10 through 22, 15 and earths the electrometer system 8. When the tension ceases the blade 9 is returned into its medial position and the contact 21 broken.

As now no current flows through coil 13 the armature 14 is pulled back by spring 23 so that it still bridges on the spring contacts 15 and 16 but not over spring contact 22. Thus the initial position is again reached and a fresh measuring operation initiated by depressing the key.

The several parts of the measuring arrangement, that is the ionization chamber 1 and the electrometer relay 8, 9 and also the condenser 3 with the element for connection to the network consisting of the transformer 5 and the valve 4 and designed for re-charging of the condenser 3 to about 1500 volts are mounted on a bracketlike frame, which is covered by a hood 25 resembling a shell's head. For facilitating the removal of the hood 25 and the carrying of the instrument the hood 25 has indented portions 25a in its sides.

The carrying frame is composed of a base plate 26 and of a top supporting plate 27 interconnected by ribs 28. The supporting plate 27 carries the ionization chamber 1 with the measuring relay 8, 9 and the condenser 3 and further on the lower side a base 29 of the valve tube 4, whereas on the base plate 26 the transformer 5 and a small pedestal 30 for the plugs of the coupling are fixed by screws. The base plate 26 has a cavity 31, into which project the head of valve 4 and knob 32 for adjusting the sensitiveness of the relay. In this manner the valve and the turn knob are accessible without the necessity of removing the hood and they are nevertheless protected so that they cannot be accidentally damaged nor thrown out of adjustment.

Figure 11:
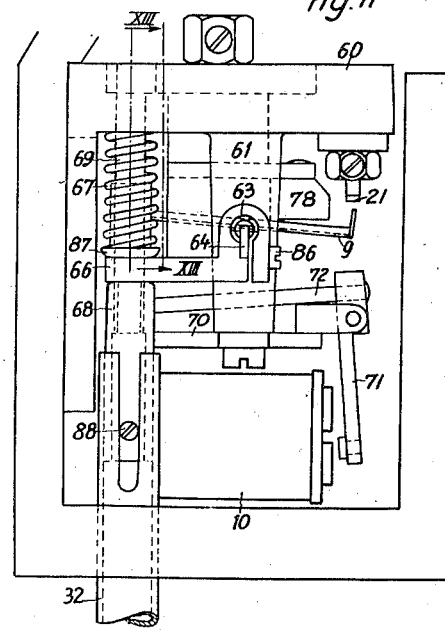
Fig. 11 shows the electrometer of Fig. 4 on a larger scale.

The adjustment of the sensitivity of the relay is effected by the knob 32 (Fig. 11) in that by turning this knob a set screw is rotated which displaces the pivot axis of the blade 9 by suitable transmission means, so that the fundamental position of the blade 9 is changed relatively to the contact 21. The further the blade 9 is moved away from the contact 21 the higher will be the tension which is necessary for responding of the electrometer, that is the less sensitive will the electrometer become.

Figure 13:
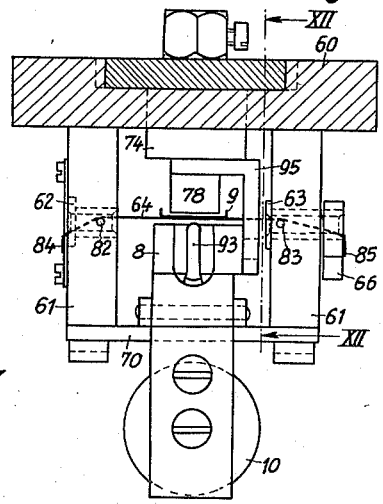
Fig. 13 is a section on line XIII—XIII of Fig. 11.
Figure 12:
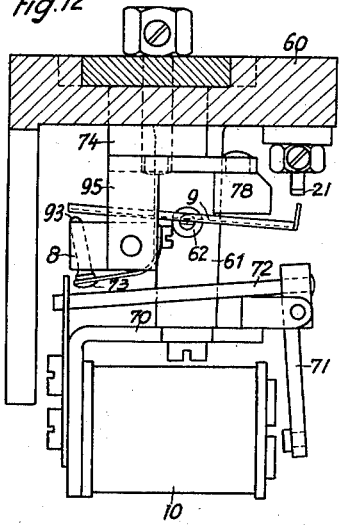
Fig. 12 is a section on line XII—XII of Fig. 13.

On a base plate 60 (Figs. 11 to 13) two metal supports 61 are fixed, bored at the middle. In the bores a sleeve 62, 63 respectively is located, carrying each at the middle a pin 82, 83 respectively. A band 64 of phosphor bronze is stretched over these pins and soldered at 84, 85 respectively on the sleeves 62, 63. On this phosphor bronze band 64 a thin aluminum plate 9 is fixed so that it can turn through a small angle in opposition to the torsional tension of the phosphor bronze band. A lever 66 is slipped over the sleeve 63 and is securely held on this sleeve by a screw 86. The bifurcated end of this lever 66 grips over a screw threaded bolt 69 which is fixed on the plate 60. The lever 66 is pressed by means of a guide sleeve 87 exposed to the action of a spiral spring 67 on to an internally threaded sleeve 68 screwed on bolt 69 and carrying a pin 88. A slot in the upper hollow end of rod 32 engages over the pin 88 so that sleeve 68 carries out the same revolving movements as rod 32. If sleeve 68 is screwed upwards on the bolt 69 by the action of rod 32, the lever 66 is raised against the action of spring 67 and the phosphor bronze band 69 turned so that the angle between the aluminium blade 9 and the horizontal plane becomes larger.

A magnet frame 70 on the supports 61 carries a coil 10 and an armature 71, 72 is pivotally mounted on this frame. If arm 71 of this armature is attracted owing to circuit-closing, arm 72 ascends and touches the contact 73.

The upper electrometer plate 78 and the lower electrometer plate 8 are fixed on an angular piece 95 fixed on the piece of amber 74. These two plates 78 and 8 are positioned so that the electrometer plate 9 is accurately between them.

If the electrode 7 is charged by the ionization in the ionization chamber, the two plates 8 and 78 are also charged. As soon as the voltage on these two plates has reached a predetermined magnitude the plates can attract the blade 9 and turn the same in opposition to the action of the elastic suspension, until it touches the contact 21. If magnet coil 10 is energized, the arm 72 of the armature touches the contact 73 (Fig. 10) on plate 8 and thereby leads off to the ground the charge on the plates 8 and 78. At the same time pin 93 tightly touches the blade 9 so that, even if by the leakage of current, welding should have occurred on the contact 21, the blade is mechanically lifted off this contact.

The greater the distance between the blade 9 and the contact is in the initial position, the higher will be the voltage which is necessary for the responding to the electrometer, that is the greater becomes the insensitiveness of the electrometer. The distance between the blade and the contact 21 in the inoperative position can be regulated by means of the knob 32 (Fig. 12), the sleeves 68 and the lever 66 and thereby also the sensitiveness of the electrometer.

The ionization chamber 1 (Fig. 1) is made of artificial resin and rendered conductive on the inner wall by graphite. The electrode 7 is connected by a conductor 33 to the measuring relay 8, 9 of usual construction (hammer dosimeter). The chamber and the relay are enclosed on a ray-proof lead box 34. The step-shaped arrangement of this box results in a compact construction of the ionization chamber and the relay the chamber being situated directly under the inlet aperture on the apex of the casing. A screen 35, screwed on to the hood, covers the inlet aperture. The inner surface of this screen is lined with lead 36. Between this lead screen and the chamber a disc 37 is located which can be turned by means of a knob 38. This disc, consisting for instance of sheet brass, has two windows 39 and 40. The window 39 is closed by a filter, the window 40 being open but of considerably smaller diameter than the window 39. This arrangement serves for dosing with the same chamber ordinary Röntgen rays as well as the so-called marginal rays. For dosing standard Röntgen rays it is necessary to retain by a filter the electrons emanating from the lead screen. When dosing the marginal rays, however, this filter has already too strong absorption and must therefore be removed. The intensity of the marginal rays is besides so much greater that a small-sized screen must be used. In this case a thin sheet or plate of brass is sufficient as screen on account of the extraordinarily low penetrating capability of these rays.

For dosing standard Röntgen rays the sector 37 is turned by means of the knob 38 so that the filter 39 registers with the hole 42 (as shown in the drawings). If marginal rays have to be measured, the screen 40 is positioned over the hole. In order to protect the sensitive window if it is not used, the solid portion 41 of the screen can be turned to cover the hole 42. For connecting the measuring instrument the coupling 46 Figs. 3, 5 and 8 is employed having an interchangeable switch disc 58 Figs. 7 and 8 in which seven sleeves I–VII are embedded. From the connecting point I–VII leads a three-wire cable 159 to the network and a four-wire cable 160 to the automatic stop watch Figs. 1, 10. The network is connected to II and VI, whereas the sleeves I and VII are not connected.

To enable the measuring instrument to be connected up in a 100 or 220 volt network the primary winding of the transformer is subdivided into two halves which are according to the network voltage connected in parallel or in series by switch discs placed on the plug coupling. One of the halves of the transformer is connected to the points I and VI and the other half to the points II and VII. The switch disc for 100 volts Fig. 7 carries two small leaf springs 43 and 44 which connect the points VI and VII and I and II conductively respectively when the coupling is placed over the plug pins in the instrument.

The two winding halves of the transformer are thus connected in parallel. The 220 volt disc illustrated in Fig. 7a carries only one spring 45 which connects the points I and VII, whereas the two winding halves are series connected. The plug coupling 46 is placed on to the plug after the hood has been put on through a hole in this hood. The internal parts of the instrument become accessible only thereby if by removing of the coupling the apparatus has become currentless.

The stop watch 11 is mounted on an insulating block 47 having an inclined surface and carrying the springs 18, 19 and 20 of the switch device. The arrangement and operation has already been described in detail with reference to the switching diagram. The whole is located in a casing 48 of insulating material in which also the push-key 17 for the operation of the two-step switch is guided.

For the continuous supervision of the measuring accuracy of the dose output meter a radium preparation can be brought underneath the bottom of the ionization chamber, said preparation radiating through a hole in the bottom plate of the chamber into this chamber. The ionization produced by the preparation corresponds to the constant Röntgen radiation to which the instrument must respond always in the same manner. As soon as, by alteration of the electrometer constants, the period of one operation of this constant radiation changes, the sensitiveness of the electrometer system can be changed by means of the adjusting knob 32 until the prescribed running of time has been attained again. If this is the case, the impinging Röntgen rays will be surely measured in accordance with the gauging of the instrument.

The radium preparation 49 (Fig. 5) is mounted in a sector 50 (Figs. 4 and 5) adapted to be swung around a pivot 51. The handle 52 extends through a hole 54 in the hood Fig. 10. In Fig. 5 of the drawing the radium preparation 49 is shown as cut out, which means that its rays impinge against the bottom plate of the chamber where they remain ineffective. By pulling the handle 52 the preparation is swung to under the hole 53 in the bottom plate of the chamber so that the alpha rays penetrate into the chamber and can develop their ionizing effect in this chamber for taking control measurements.

The simplicity of the attendance corresponds to the extremely simple and clear construction of the instrument. By a pressure on the switch knob the measuring proceeding is initiated. The Röntgen rays impinging on to the chamber ionize the air content and charge thereby the electrometer. As soon as about 10 roentgens have impinged on to the chamber, the relay responds and stops the watch. A few seconds after the initiation of the measuring operation it is possible to read on the watch which time was necessary for obtaining 10 roentgens. A chart shows for this number of seconds the dosed output in roentgens per minute, further the number of minutes which are necessary for obtaining from 600 to 650 and 700 roentgens. Not only the dose output in roentgens per minute has been read at a glance and without any calculation, but also the time in minutes which is necessary for the obtaining of the usual skin unit dose, that is a dose which can be borne by the human skin without injury and amounts to about 600 roentgens.

1. An instrument for the determination of the intensity of Röntgen and other ionizing rays, comprising in combination a transformer consisting of two circuits the first including the transformer primary and the second the transformer secondary adapted to be energized by said primary, said transformer secondary consisting of a high voltage section and a low voltage section, a valve in the high voltage section of the circuit including said secondary, a condenser adapted to be charged by said valve, an ionization chamber connected with the high voltage section of said secondary, an electrode extending into said chamber and adapted to receive current from said chamber, an electromagnetic relay comprising two contact plates connected with said electrode and an earthed resiliently mounted rocker blade adapted to be attracted by said contact plates, a contact adapted to be closed by said rocker blade, a switching means connected to the low voltage section of said transformer secondary, a wire connecting said contact with one step of said switching means, an earthing line connected to said switching means, an electromagnetic relay, comprising an armature and adapted to close and to interrupt said earthing line, a stop watch control element adapted in inoperative position to close said earthing line and during the first stage of the operation of said switching means to connect said electromagnetic relay with said earthing line through the intermediary of said wire, an earthed magnet coil connected to a second step of said switching means adapted in the second operation stage of said switching means to become energized and attract said stop watch control element to start the stop watch, and a second magnet coil in said wire adapted to be energized at the closing of said contact by said blade and attract said control element and return it into its inoperative position and stop the watch.

2. In combination with the instrument specified in claim 1 a wedge shaped casing partly enclosing the instrument and having a window in its apex directly above said ionization chamber for the admission of the rays and a second casing enclosing the stop watch and separate from said first mentioned casing.

3. In an instrument as specified in claim 1 a supporting bracket comprising an upper plate carrying the ionization chamber, the electrometric relay and the condenser, a socket on the underside of said upper plate receiving said valve, and a base plate carrying the transformer, and means for connecting the transformer with a source of current.

4. In an instrument as specified in claim 1 a supporting bracket comprising an upper plate and a base plate, said base plate having a cavity receiving the head of said valve, and a turnable knob in said cavity adapted to adjust said electrometric relay.

5. In an instrument as specified in claim 1, the bottom of the ionization chamber having an aperture, a sector pivotally mounted under said chamber, a radium preparation in said sector, a handle on said sector adapted to swing said sector to bring said radium preparation under said aperture to project alpha rays into said chamber and ionize the air therein.

6. In an instrument as specified in claim 1, a casing partly enclosing the instrument and having a lateral aperture, a plug coupling adapted to be inserted in said lateral aperture to connect the instrument with the source of current and lock said casing on the instrument.

7. In an instrument as specified in claim 1 a casing having an aperture for the admission of the rays above said ionization chamber, a screen pivotally mounted above said aperture having a large window and a small window, said screen adapted to be oscillated to bring one or other window into register with said aperture, and a transparent pane in said large window adapted to intercept the normal rays, whereas said small window is open to allow the passage of the marginal rays.

8. In an instrument as specified in claim 1 an insulating block with inclined supporting surfaces for the stop watch, said block carrying the switching means on its under side, a casing enclosing the instrument and having an aperture in its upper surface above the stop watch dial and a second aperture through which an actuating member for said switching means projects.

9. In an arrangement as specified in claim 1, a casing enclosing the instrument having lateral recesses serving as handles.

10. An instrument for the determination of the intensity of Röntgen and other ionizing rays comprising a transformer consisting of two circuits, the first including the transformer primary and the second the transformer secondary adapted to be energized by said primary, a valve in the high voltage section of the circuit including said secondary, a condenser adapted to be charged by said valve, an ionization chamber connected with the high voltage section of said secondary, an electrode extending into said chamber and adapted to receive current from said chamber, an electro-magnetic relay comprising two contact plates connected with said electrode, said primary composed of two sections, a plug coupling in said primary, pins on said plug, two exchangeable control disks adapted to be placed on said pins, both disks provided with four contact points connected to both sections of the primary circuit, one disk having contact strips connecting in parallel the two sections of the primary for 110 volts, and the other disk having contact strips connecting in series the two sections of the primary for 220 volts.

HERBERT PYCHLAU.